Patented Mar. 30, 1926.

1,579,195

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

FLUXED RESINOUS COMPOSITION AND PROCESS OF MAKING SAME.

No Drawing. Application filed December 17, 1924. Serial No. 756,559.

*To all whom it may concern:*

Be it known that I, CARLETON ELLIS, a citizen of the United States, and a resident of Montclair, in the county of Essex and State of New Jersey, have invented certain new and useful Improvements in Fluxed Resinous Compositions and Processes of Making Same, of which the following is a specification.

This invention relates to resinous bodies and compositions and to the process of making same and relates especially to resinous compositions which are fluxed or softened by the employment of a compound of ammonia and formaldehyde such as hexamethylenetetramine or other aldehyde-ammonia or aldehyde-amino compounds having equivalent properties, (hereinafter included in the term "aldehyde-volatile-alkali compound", in some of the claims).

The invention will be described particularly with reference to the employment of hexamethylenetetramine ("hexa" as it will hereinafter be called) as a fluxing, softening or plasticizing agent but it should be understood that I do not wish thereby to impose any limitations on the scope of the present application.

In molding articles, especially those of intricate shape it is desirable that the molded article at the finish of the cure on removal from the mold be slightly flexible or rubbery, not enough to cause any deformation but just sufficient to prevent breakage on extracting the molded piece from a mold of complicated construction. This is especially desirable in the case of molded articles having many inserts molded in place. However this rubbery quality should be very slight, only sufficient to avoid that brittleness which may subsequently become more manifest as the molded article cools.

Furthermore it is desirable to have a composition the resinous component of which flows readily under the application of heat so that the molded composition may fill all parts of the mold and yield a sharp impression thereof. If the surface of the mold is highly polished the molded article likewise will acquire a high surface finish or lustre if the composition is of a free flowing character. If it does not flow readily curious markings appear on the surface of the molded article and frequently there is a crumbly portion at the sharp edges of the specimen while if made from a free flowing composition such portion would be sharp and well defined.

In the present invention the employment of phenol or of mixtures of phenol with ortho, meta and para cresol is not precluded but I preferably employ as the raw material crude coal tar acids having a boiling point range above phenol and containing cresols and xylenols. The cresols or xylenols by themselves or in admixture also may be used, likewise any particular isomer or mixture of isomers. Furthermore I do not exclude compounds having a boiling range above the xylenols but may use mono- or poly-hydroxylated derivatives of benzene, naphthalene and the like whether liquid or solid irrespective of boiling point is so far as they may be adapted to the purposes of the present invention.

The invention therefore will be described particularly with reference to the employment of the relatively cheap cresols and xylenols or mixtures containing these such as crude coal tar acids, but such description, it is understood, shall not serve as a limitation as to the scope of the present invention. It may be added however that I have noted a more effective plasticizing action (fluxing or softening effect) by hexa on the cresol and xylenol derivatives than in the case of phenol derivatives.

In applications filed hereto and copending herewith I have described molding compositions prepared from resinous products of the magnesium cresylate or magnesium xylenate type. In certain of the aforesaid applications I have mentioned the very rapid curing qualities of such magnesium-containing resins. The very high velocity of hardening possessed by some of these resins is remarkable, especially since such rapid curing qualities appear to be exhibited when employing cresols or crude tar acids which ordinarily are looked upon as relatively sluggish. In fact the rate of curing in the case of certain magnesium cresylate resins progresses at an almost uncontrollable velocity and the avoidance of premature-curing in preparing the resin requires special precautions. One means for overcoming the too rapid cure of these magnesium cresylate resins that has been proposed is that of pre-forming or tableting the article to be molded. After such pre-forming the shaped material is placed in a hot press and molded. Under the circumstances the distance of travel (displacement) of a given particle of the mass is less than when the composition as a loose powder is placed in the hot mold and a considerable degree of displacement occurs in hot pressing. Consequently by tableting, the difficulty of pre-setting before flowing into place although not eliminated is reduced.

With resins possessing such tendency to prematurely-curing or pre-setting (or as it is sometimes termed "over-curing") advantageous results may be obtained by incorporating with the resin or molding composition at any suitable stage of the process of preparation an amount of hexa sufficient to have a fluxing, softening and plasticizing action, whereby a good flow is given to the composition when hot pressed and the molded article receives a high finish with sharply defined edges.

Several advantages accrue from preparing an over-reacted resin for molding purposes. By advancing the reaction as far as may be, a lesser degree of chemical change is required in the mold with the possibility of diminished change in volume, shrinkage, cracking and the like.

When reacting on tar acids (not the magnesium compounds referred to above) with formaldehyde there appears to be special advantages in advancing the reaction before molding to a degree such that for use under ordinary molding conditions the resulting resin would be considered worthless due to its being non-flowable or difficultly-flowable. However advancing the reaction in this way brings about better combination of the tar acids, any substantial proportion of which, if in a free state otherwise might attack the highly polished metal surfaces of the mold. It is advantageous to use a proportion of aldehyde (specifically formaldehyde) sufficient to combine completely with the tar acid or other raw material employed. e. g. equivalent proportions or in some cases larger proportions of the aldehyde. If relatively small amounts are used the reaction generally progresses to give highly fusible resins containing considerable unchanged tar acid in which case there is danger that pitting of the mold may occur.

In the preferred embodiment of the present invention I may carry the reaction before molding to a degree yielding from the present hot-pressing standpoint, a poorly flowable or substantially technically unflowable resin which in reality would be practically non-fusible, being merely heat-ductile to some extent; such resin being desirably free from unconverted tar acid, with one object to reduce or eliminate extraneous reactions otherwise likely to take place in the mold. A resin of this character is incorporated with hexa so as to render it, on hot pressing, soft and flowable, without undue sacrifice of the normal self-hardening qualities of the resin (without hexa). By such addition of hexa as a plasticizing agent not only does the resin become sufficiently flowable but its set may be thereby retarded in a controllable manner and the desired reactions which take place in hot-pressing may therefore be expected to progress simply and effectively without undesirable side reactions and troubles from objectionable blistering, excessive sticking to molds, roughened surface, lack of uniformity in strength, variable electrical resistance and other defects.

In using the various terms such as nonflowable, unflowable, poorly flowable, difficultly flowable and the like I have especially in mind molding compositions made from resin and fillers rather than the resin alone. The resin by itself is rarely shaped by hot pressing for commercial purposes but is first incorporated with various fillers and extending agents to reduce the cost and for various other reasons. Thus the resin may be admixed with at least its own weight of suitable filling material and when thus incorporated will be considerably more resistant to flow than without such filler. Hence in the present specification I may use said terms respecting flowability to apply to the resin or to the resin and filler mixture as the case may be.

The following illustrates the plasticizing effect of hexa on a resin of the magnesium cresylate type.

440 parts by weight of metaparacresol were mixed with a like weight of magnesium oxide formaldehyde composition prepared by grinding in a pebble mill 120 parts by weight of magnesium oxide with 540 parts of aqueous formaldehyde of approximately 40 per cent strength. The mixture of the metaparacresol and the magnesium formaldehyde material was heated in a water bath the temperature of which was 70° C. and was agitated for a period of about 50 minutes.

A small portion of this solution was dried in a vacuum dryer to a temperature reaching 90° C. and the residue was found to be 62 per cent of the weight of the solution. When this dried resin without filler was hot pressed at 160° C. it was found to have very rapid hardening properties. Within approximately one minute the resin hardened in the mold to a stiff product which could be subjected to a pressure of 1000 pounds without squeezing out of the mold.

While the small sample of resin solution was being dried to determine the proportion of resin in solution and to ascertain behavior of the resin alone on hot pressing, the remainder (practically the entire amount, as the sample used in the drying test was a small one) of the solution of the resin was mixed with 500 parts of wood flour and ½ of 1 per cent of nigrosine was added. The moist composition was mixed in a Werner Pfleiderer mixer for 1 hour, reversing rotation of the mixing blades every 10 minutes. The moist composition of resin and filler, black in color due to the nigrosine, was dried in an ordinary vacuum dryer the temperature of which was carried to 97° C. resulting in a loss in weight of 23.3 per cent. On subjecting this composition to hot pressing at 160° C. and 1000 pounds pressure a molded article was obtained which had an unsatisfactory surface due to the poor flowing qualities of the composition, as was to be expected from the preliminary test made with the resin without filler. In other words this composition would be regarded (for ordinary molding purposes) as "overcured." The resin did not flow to the surface sufficiently to coat the particles of filler satisfactorily and instead of a uniform glossy black surface it was observed that due to such lack of flow or plasticity the surface had a grayish appearance or what may be termed "uncoated." 20 parts by weight of the composition then were ground with 2 parts of hexa and molded under the same conditions. An improvement in the flow was at once observed. The molded articles exhibited a far better surface, which was uniformly coated with the resin. Without the hexa the unreacted material when hot pressed did not form any fin, showing that the plasticity was so slight that the resin would not extrude along the working parts of the mold. When however hexa was added to such over reacted molding composition a fin was obtained. It may be noted that in practical molding operations the operator judges the flow or plasticity of the composition to a very considerable degree by the width of the extruded portion or fin. Such very simple test clearly indicates the plasticizing or softening effect of hexa employed under the foregoing conditions.

The various fillers which are customarily employed in the plastic molding field such as mineral fillers e. g. asbestos, clay, mica powder and the like and organic fillers such as linters, sawdust, ground wood or wood flour, cotton flock and the like may be used. Suitable coloring matters such as dyes or pigments may be added. Substances for lubricating the mold or preventing sticking may be added such as aluminum palmitate, zinc stearate, calcium stearate, magnesium stearate and other metallic soaps. Also in some cases stearic acid, paraffin wax and the like may be added. In some cases calcium or magnesium oxide may be introduced along with stearic acid.

There also may be present if desired various extending substances including rosin, copal, asphalt, gilsonite and the like. The use of aldehydes other than formaldehyde and its polymers is not precluded including acetaldehyde, paraldehyde, acrolein, butyl aldehyde, furfural and the like. Such aldehydes may be employed in making the resin or they may be combined with ammonia to make ammonia aldehydes to be employed as plasticizing agents under the conditions set forth herein.

The proportion of formaldehyde may be varied considerably in preparing the resin and in like manner the proportion of hexa may be increased or decreased considerably. Admixing with a prematurely reacted resin even one or two per cent of hexa often will show considerably improved results. The proportion of hexa therefore may be varied to correspond to the degree of advancement of the reaction which the resin has undergone prior to molding.

Although the preferred embodiment of the present invention discloses the employment of magnesium resins, that is resins which are formed with the aid of magnesium oxide or hydroxide and the like and which contain the magnesium as an essential element it should be understood that I do not limit myself to this particular type of resin. In some cases resins may be made from the corresponding calcium or barium compounds, although these as a rule are not as controllable as those made from magnesium compounds. I prefer to use a full molecular equivalent of magnesium oxide to a molecular equivalent of the cresol or xylenol or other substance employed in making the resin. However the proportion of such magnesium material may likewise be varied. By using two equivalents thereof conditions appropriate to yield a more basic resin will result.

The employment of hexa or other aldehyde ammonia compounds and their derivatives is not limited to the cresylate resins nor to those of the xylenitic type, that is those made from xylenols. Resins prepared in any other way as for example those produced by reacting with acetone on formaldehyde in the presence of caustic alkali, or those obtained by treating urea with formaldehyde in the presence of an acid or alkali. or resins obtained from phenol and formaldehyde in the presence of a small amount of ammonia or other alkaline substance—all may be fluxed, softened and plasticized by hexa or other aldehyde ammonia compound as the case may be. However it should be noted that some of the fusible resins made in various ways as for example those obtained by reacting on phenol (carbolic acid) with considerably less than an equivalent amount of formaldehyde and which do not harden or set in the mold on hot pressing and which moreover oftentimes contain a considerable amount of free phenol are not well adapted for carrying out the present invention, since the latter in its preferred form is concerned in some cases at least with resins which cannot be regarded as fusible but which are merely heat-ductile to some extent. Such heat-ductile resins do not fuse in the ordinary sense of the word but when exposed to a suitable temperature under high pressure will compact and consolidate or cohere to form a rough molded article. The unduly rapid hardening qualities which such resins normally possess precludes their use in such state for molding purposes. The condition is very much aggravated when a filler is added.

An example which illustrates the foregoing is the following:

488 parts by weight of crude tar acids (boiling between 200 and 220° C., approximately one-half boiling above 212° C.) were mixed with 480 parts of magnesium formaldehyde mixture prepared by grinding in a ball mill 80 parts by weight of magnesium oxide and 400 parts of aqueous 40 per cent formaldehyde solution. 800 parts of strong brine were added and the mixture was boiled under a reflux condenser for 4 hours. 1045 parts of solid material was obtained after decantation of the brine. A yellow hard brittle product was obtained which contained some water. The material was ground and spread out to dry at room temperature for 24 hours. When tested on the hot plate this resin did not shown any indications of being fusible but became merely heat-ductile. On hot pressing the resin without filler at a temperature of 160-165° C., full pressure of 1000 pounds could be applied at once without the resin squeezing out along the working parts of the mold. The molded article was opaque, with a dull light yellow mottled surface and showed no fin nor any indication that the resin had any flow whatsoever. To be sure the powdered resin had compacted into a firm mass but the particles were not fully knit together as would have been the case had the resin been of a fusible character.

A remarkable change was noted when hexa was added to this prematurely reacted quick-setting resin. 10 per cent of hexa was incorporated with the resin and on hot pressing under like conditions a molded article brown in color with a lustrous, instead of a dull surface, with sharp instead of crumbly edges and with indications of a fin was obtained.

What I claim is:—

1. In a molding composition containing an unduly rapid curing resin the step of incorporating hexamethylenetetramine in such proportions as to function as a fluxing and softening agent.

2. The process which comprises incorporating hexamethylenetetramine with a resinous product having unduly rapid hardening qualities, in such manner that a slower rate of hardening is secured.

3. In the process of making molding compositions which have the property of hardening on hot pressing the step which comprises incorporating a compound of ammonia and formaldehyde with a resinous product normally having unduly rapid hardening qualities, in such proportion that a slower rate of hardening is secured and a molded article of good surface finish and exhibiting a sharp impression of the mold, is obtained.

4. The process which comprises incorporating hexamethylenetetramine with magnesium cresylate resin having unduly rapid hardening qualities, for the purpose and with the result of reducing the rate of hardening and securing a molded article having a sharp impression of the mold.

5. The process which comprises incorporating in a cresol resin molding composition a quantity of hexamethylenetetramine sufficient to act as a fluxing agent.

6. The process which comprises incorporating hexamethylenetetramine with a phenolic resin having the property of hardening too rapidly in the hold on hot pressing for the purpose and with the result of fluxing and softening the composition undergoing hot pressing whereby a molded article possessing a sharp impression of the mold is obtained.

7. The process which comprises incorporating hexamethylenetetramine with a resin of the magnesium cresylate type having the property of hardening too rapidly in the mold on hot pressing, for the purpose and with the result of fluxing and softening the composition undergoing hot pressing whereby a molded article possessing a sharp impression of the mold is obtained.

8. An overcured molding composition fluxed with hexamethylenetetramine.

9. In molding compositions, an unduly rapid curing resin incorporated with hexamethylenetetramine as a fluxing and softening agent.

10. In molding compositions, an unduly rapid curing resin incorporated with a compound of ammonia and formaldehyde in such proportion as to act as a fluxing agent.

11. In molding compositions, an unduly rapid hardening resin incorporated with hexamethylenetetramine as a softening agent.

12. In molding compositions, an unduly rapid hardening resin of the magnesium cresylate type incorporated with hexamethylenetetramine as a softening agent.

13. In molding compositions, an unduly rapid hardening synthetic resin incorporated with hexamethylenetetramine in such proportion as to constitute a softening agent.

14. In the art of molding resinous compositions containing resins of the type ordinarily hardened by the action of hexamethylenetetramine in the hot press the step which comprises incorporating hexamethylenetetramine in compositions which otherwise would harden too rapidly in the mold for giving molded articles having a good finish, and hot pressing such compositions whereby setting takes place in the mold without excessively rapid hardening and a molded article of good finish and affording a sharp impression of the mold is obtained.

15. A heat-setting resinous composition and a set-retardant therefor comprising hexamethylenetetramine.

16. A resin of the class producible by reacting with a phenolic body and formaldehyde, too stiff in flow for ordinary hot molding purposes, incorporated with a hexamethylenetetramine softening and flow-producing agent.

17. A substantially permanently fusible resin product comprising resinous material derived from a phenolic body and an aldehyde intimately incorporated with hexamethylenetetramine.

18. In the art of rapid molding by hot-pressing, the step which comprises intimately incorporating hexamethylenetetramine with a self-hardening substantially heat-ductile resinous composition in which the resin-setting operation is too far advanced for giving satisfactory molded articles; whereby said composition, without loss of self-hardening qualities, becomes sufficiently flowable to be employed in rapid hot-pressing operations.

19. In the art of rapid molding by hot-pressing, the step which comprises intimately incorporating hexamethylenetetramine with a self-hardening difficultly-flowable resinous composition; whereby said composition, without loss of self-hardening qualities, becomes sufficiently flowable to be employed in rapid hot-pressing operations.

20. A self-hardening substantially non-fusible but heat-ductile resinous composition containing an aldehyde ammonia compound imparting plasticizing properties.

21. A resin substantially non-fusible but capable of cohering on compression when hot-pressed, incorporated with hexamethylenetetramine.

22. In the art of molding, the steps of incorporating material containing overcured resin with an aldehyde-volatile-alkali compound capable of serving as a fluxing agent for such overcured resin and molding.

23. A composition comprising a resin which itself alone or mixed with a filler is not sufficiently fusible to produce good molded articles, together with hexamethylene tetramine in amount sufficient to act as a flux.

24. The step of molding a composition comprising a resin which itself alone or mixed with a filler is not sufficiently fusible to produce good molded articles, together with hexamethylene tetramine in amount sufficient to act as a flux whereby the hexamethylene tetramine acts to increase the flowability of the resin to produce a good molded article.

25. A composition comprising a resin of so advanced a degree of curing as to be of itself non-useful and impractical as a molding resin, together with an aldehyde-volatile-alkali compound capable of overcoming said defect.

26. A composition of matter adapted for molding comprising a resin which when heated does not liquefy sufficiently to mold well, together with an aldehyde-volatile-alkali compound in amount sufficient to act as a fluxing agent therefor.

27. A composition of matter adapted for molding comprising a resin of the phenol-aldehyde class, which when heated does not liquefy sufficiently to mold well, together with an aldehyde-volatile-alkali compound in amount sufficient to act as a fluxing agent therefor.

28. A composition of matter adapted for molding comprising a resin of the phenol-homologue-aldehyde class, which when heated does not liquefy sufficiently to mold well, together with a sufficient amount of an aldehyde-volatile-alkali compound to act as a fluxing agent therefor.

29. A composition of matter adapted for molding comprising a resin derived by the reaction of a phenolic body containing at least one methyl group upon an aldehyde, which resin when heated does not liquefy sufficiently to mold well, together with a sufficient amount of an aldehyde-volatile-alkali compound capable of acting as a fluxing agent therefor, to give a good degree of flowability to the resin.

30. A composition adapted for molding, comprising a resin which without fluxing agents is insufficiently fusible to form good molded articles in ordinary hot molding operations, together with an aldehyde-volatile-alkali compound capable of serving to increase the flowability of said resin.

31. A composition of matter adapted for molding comprising a resin derived by the reaction of cresol upon an aldehyde, which resin when heated does not liquefy sufficiently to mold well, together with a sufficient amount of an aldehyde-volatile-alkali compound capable of acting as a fluxing agent therefor, to give a good degree of flowability to the resin.

32. A composition of matter adapted for molding comprising a resin made by the reaction of cresol upon formaldehyde, which resin when heated does not liquefy sufficiently to mold well, together with a sufficient amount of an aldehyde-volatile-alkali compound capable of acting as a fluxing agent therefor, to give a good degree of flowability to the resin.

33. In the art of molding resinous compositions containing resins of the type ordinarily hardened by the action of hexamethylenetetramine in the hot press the step which comprises incorporating hexamethylenetetramine in compositions which otherwise would harden too rapidly in the mold, for giving molded articles having a good finish, the amount of hexamethylenetetramine being sufficient to cause the subsequent setting during the molding operation to take place without excessively rapid hardening, to produce molded articles of good finish and to give sharp impressions.

CARLETON ELLIS.